(12) United States Patent
Eisele et al.

(10) Patent No.: US 9,761,905 B2
(45) Date of Patent: Sep. 12, 2017

(54) LITHIUM ION-CONDUCTING GARNET-LIKE COMPOUNDS

(75) Inventors: Ulrich Eisele, Stuttgart (DE); Thomas Koehler, Stuttgart (DE); Stefan Hinderberger, Stuttgart (DE); Boris Kozinsky, Waban, MA (US); Alan Logeat, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 604 days.

(21) Appl. No.: 14/233,940

(22) PCT Filed: May 21, 2012

(86) PCT No.: PCT/EP2012/059321
§ 371 (c)(1),
(2), (4) Date: Jun. 13, 2014

(87) PCT Pub. No.: WO2013/010692
PCT Pub. Date: Jan. 24, 2013

(65) Prior Publication Data
US 2014/0295287 A1 Oct. 2, 2014

(30) Foreign Application Priority Data
Jul. 19, 2011 (DE) .................. 10 2011 079 401

(51) Int. Cl.
*H01M 10/0562* (2010.01)
*C01G 25/00* (2006.01)
(Continued)

(52) U.S. Cl.
CPC ...... *H01M 10/0562* (2013.01); *C01G 25/006* (2013.01); *C01G 33/006* (2013.01);
(Continued)

(58) Field of Classification Search
CPC ............ H01M 10/0562; C01G 25/006; C01G 33/006; C01G 35/006; C04B 35/481; C04B 35/486; C04B 35/495
(Continued)

(56) References Cited

U.S. PATENT DOCUMENTS

2007/0148553 A1 * 6/2007 Weppner ............... C01G 33/006
429/322

FOREIGN PATENT DOCUMENTS

DE   10 2004 010892    11/2005
EP   2 159 867         3/2010
(Continued)

OTHER PUBLICATIONS

Ramzy, Adam, and Venkataraman Thangadurai. "Tailor-Made Development of Fast Li Ion Conducting Garnet-Like Solid Electrolytes." ACS Applied Materials & Interfaces 2.2 (2010): 385-90.*
(Continued)

*Primary Examiner* — James Lee
(74) *Attorney, Agent, or Firm* — Norton Rose Fulbright US LLP; Gerard Messina (57) ABSTRACT

A lithium ion-conducting compound, having a garnet-like crystal structure, and having the general formula: $Li_n[A_{(3-a'-a'')}A'_{(a')}A''_{(a'')}][B_{(2-b'-b'')}B'_{(b')}B''_{(b'')}][C'_{(c')}C''_{(c'')}]O_{12}$, where A, A', A" stand for a dodecahedral position of the crystal structure, where A stands for La, Y, Pr, Nd, Sm, Eu, Gd, Tb, Dy, Ho, Er, Tm and/or Yb, A' stands for Ca, Sr and/or Ba, A" stands for Na and/or K, $0<a'<2$ and $0<a''<1$, where B, B', B" stand for an octahedral position of the crystal structure, where B stands for Zr, Hf and/or Sn, B' stands for Ta, Nb, Sb and/or Bi, B" stands for at least one element selected from the group including Te, W and Mo, $0<b'<2$ and $0<b''<2$, where C and C" stand for a tetrahedral position of the crystal structure, where C stands for Al and Ga, C" stands for Si and/or Ge, $0<c'<0.5$ and $0<c''<0.4$, and where $n=7+a'+2\cdot a''-b'-2\cdot b''-3\cdot c'-4\cdot c''$ and $5.5<n<6.875$.

33 Claims, 3 Drawing Sheets (51) Int. Cl.

| | | |
|---|---|---|
| C01G 33/00 | (2006.01) | |
| C01G 35/00 | (2006.01) | |
| H01M 10/052 | (2010.01) | |
| C04B 35/48 | (2006.01) | |
| C04B 35/486 | (2006.01) | |
| C04B 35/495 | (2006.01) | |
| C04B 35/626 | (2006.01) | |

(52) U.S. Cl.
CPC .......... *C01G 35/006* (2013.01); *C04B 35/481* (2013.01); *C04B 35/486* (2013.01); *C04B 35/495* (2013.01); *C04B 35/62675* (2013.01); *H01M 10/052* (2013.01); *C04B 2235/322* (2013.01); *C04B 2235/3203* (2013.01); *C04B 2235/3213* (2013.01); *C04B 2235/3227* (2013.01); *C04B 2235/3244* (2013.01); *C04B 2235/3251* (2013.01); *C04B 2235/3418* (2013.01); *C04B 2235/6562* (2013.01); *C04B 2235/764* (2013.01); *H01M 2300/0071* (2013.01)

(58) Field of Classification Search
USPC .................................................. 429/319–322
See application file for complete search history.

(56) References Cited

FOREIGN PATENT DOCUMENTS

| | | |
|---|---|---|
| JP | 08325014 A | 12/1996 |
| JP | 2006062896 A | 3/2006 |
| JP | 2007528108 A | 10/2007 |
| JP | 2010 272344 | 12/2010 |
| JP | 2011073963 A | 4/2011 |
| JP | 2011094765 A | 5/2011 |
| JP | 2012-224520 A | 11/2012 |
| WO | 2005/085138 | 9/2005 |
| WO | 2009/003695 | 1/2009 |

OTHER PUBLICATIONS

Geiger, Charles A., Evgeny Alekseev, Biljana Lazic, Martin Fisch, Thomas Armbruster, Ramona Langner, Michael Fechtelkord, Namjun Kim, Thomas Pettke and Werner Weppner. "Crystal Chemistry and Stability of "Li7La3Zr2O12" Garnet: A Fast Lithium-Ion Conductor." Inorganic Chemistry 50 (2010): 1089-1097.*

Huang, Mian, Alexandre Dumon, and Ce-Wen Nan. "Effect of Si, In and Ge doping on high ionic conductivity of Li7La3Zr2O12." Electrochemistry Communications 21 (2012): 62-64.*

Asha Gupta et al. : "Optimum lithium-ion conductivity in cubic Li7-xLa3Hf2-xTaxO12", Journal of Power Sources, Elsevier SA, CH, vol. 209, Mar. 3, 2012, pp. 184-188, XP028411910, ISSN : 0378-7753, DOI : 10.1016/J.JPOWSOUR.2012.02.099 [retrieved on Mar. 3, 2012] Seite 184 "2. Experiment"—Seite 185 "3. Results and discussion"; Abb.1.

Yutao Li et al : "High lithium ion conduction in garnet-type Li6La3ZrTao012", Electrochemistry Communications, Elsevier, Amsterdam, NL, vol. 13, No. 12, Aug. 18, 2011, pp. 1289-1292, XP028125086, ISSN: 1388-2481, DOI: 10.1016/J.ELECOM.2011. 07.008 [retrieved on Aug. 18, 2011].

Thangadurai V et al : "Investigations on electrical conductivity and chemical compatibility between fast lithium ion conducting garnet-like Li6BaLa2Ta2012 and lithium battery cathodes", Journal of Power Sources, Elsevier SA, CH, vol, 142, No. 1-2, Mar. 24, 2005, pp. 339-344, XP004812990, ISSN: 0378-7753, DOI: 10.1016/J. JPOWSOUR.2004.11.001 Seite 340 "2.1 Synthesis and phase characterisation"; Zusammenfassung.

* cited by examiner

LITHIUM ION-CONDUCTING GARNET-LIKE COMPOUNDS

FIELD OF THE INVENTION

The present invention relates to compounds having a garnet-like crystal structure, lithium ion conductors and galvanic cells.

BACKGROUND INFORMATION

The use of lithium and lithium-ion batteries in electric vehicles and hybrid vehicles makes high demands of battery safety. Liquid electrolytes such as DMC/EC/LiPF$_6$ are often flammable. Solid ceramic electrolyte materials, however, are only flame-retardant and have a high stability. However, solid ceramic electrolytes have a relatively low lithium-ion conductivity at room temperature in comparison with liquid electrolytes. Lithium ion-conducting compounds are discussed in the publications WO 2005/085138, WO 2009/003695 A2, WO 2010/090301 A1 and EP 2 159 867 A1, for example.

SUMMARY OF THE INVENTION

The subject matter of the present invention is a compound having a garnet-like crystal structure of the general chemical formula:

where A, A' and A" stand for a dodecahedral position of the garnet-like crystal structure, where A stands for at least one element selected from the group including La, Y, Pr, Nd, Sm, Eu, Gd, Tb, Dy, Ho, Er, Tm and Yb, A' stands for at least one element selected from the group including Ca, Sr and Ba, A" stands for at least one element selected from the group including Na and K, $0 \leq a' < 2$ and $0 \leq a'' < 1$, where B, B' and B" stand for an octahedral position of the garnet-like crystal structure, where B stands for at least one element selected from the group including Zr, Hf and Sn, B' stands for at least one element selected from the group including Ta, Nb, Sb and Bi, B" stands for at least one element selected from the group including Te, W and Mo, $0 \leq b' \leq 2$, and $0 \leq b'' \leq 2$, where C' and C" stand for a tetrahedral position of the garnet-like crystal structure, where C' stands for at least one element selected from the group including Al and Ga, C" stands for at least one element selected from the group including Si and Ge, $0 \leq c' \leq 0.5$, and $0 \leq c'' \leq 0.4$, and where $n = 7 + a' + 2 \cdot a'' - b' - 2 \cdot b'' - 3 \cdot c' - 4 \cdot c''$ and $5.5 \leq n \leq 6.875$.

The present invention is based on the finding that the garnet-like crystal structure $Li_7La_3Zr_2O_{12}$ includes a three-dimensional network of octahedral positions, including lithium atoms having a high mobility as well as including tetrahedral positions, which act as lithium ion traps and reduce lithium ion mobility. Therefore, within the context of the present invention, a calculation was carried out, based on the fact that lithium content n has an influence on the ion conductivity, in order to investigate the influence of occupation of the octahedral and tetrahedral positions on the number of mobile charge carriers and thus on the lithium-ion conductivity. Within the scope of the present invention, it has been found that the number of mobile charge carriers and thus the lithium-ion conductivity in particular may be maximized in a targeted manner in a compound having a garnet-like crystal structure by replacing a dodecahedral position and/or an octahedral position and/or a tetrahedral position, in particular the dodecahedral position (24c) and/or the octahedral position (16a) and/or the tetrahedral position (24d) of the garnet-like crystal structure, for example, starting from $Li_7La_3Zr_2O_{12}$ or $Li_5La_3Ta_2O_{12}$ or $Li_5La_3Nb_2O_{12}$ by elements having a suitable radius, so that lithium content n is in a range of $5.5 \leq n \leq 6.875$, for example, $5.9 \leq n \leq 6.6$, in particular $6.0 < n < 6.5$, where a maximum ion conductivity is surprisingly achievable in a range around a lithium content n of 6.3.

Large elements such as Zr, Sn, Ta, Nb, Sb, Bi, Hf, Te, W and Mo in particular are suitable for the octahedral position since they increase the three-dimensional network in which the lithium ions are located and thus improve the lithium ion mobility. Such an effect may also be achieved by occupation of the dodecahedral positions with large atoms, such as La, lanthanoids, Ba, Sr, Ca, La, K and Na, for example, Ba, Sr, La and K. For the tetrahedral position in particular, elements such as Al, Ga, Si and Ge are suitable since the number of lithium traps in the vicinity of the three-dimensional network may be reduced by these elements, so that consequently the lithium-ion conductivity may be increased. The lithium-ion conductivity is advantageously optimizable on the basis of a favorable interaction of effects due to the combination of occupation of the octahedral, dodecahedral and tetrahedral positions described above. The lithium-ion conductivity at room temperature may advantageously be improved in this way. Furthermore, these compounds advantageously have a high stability and are flame retardant. The compounds according to the present invention may thus be used advantageously as lithium ion conductors, for example, as lithium ion-conducting solid electrolytes in lithium-based galvanic cells, for example.

It is possible to use technical-grade zirconium compounds, which traditionally contain some hafnium, to synthesize the compounds. Therefore, B may stand in particular for Zr containing Hf in an amount which occurs in technical-grade zirconium compounds.

Lithium content n may in particular be or $\geq 5.7$ or 5.8 or 5.85 or 5.9 or 5.95 or 6.0 and/or $\leq 6.875$ or 6.75 or 6.7 or 6.6 or 6.575 or 6.5 or 6.49 or 6.4. For example, the lithium content may be in a range of $5.5 \leq n \leq 6.875$, in particular $5.8$ or $5.85 \leq n \leq 6.75$.

Within the scope of one specific embodiment, $5.9 \leq n \leq 6.6$. For example, lithium content n may be 5.9 or $5.95 \leq n \leq 6.6$ or 5.5, in particular 6.0 or 6.01 or 6.1 or $6.2 \leq n \leq 6.5$ or 6.49 or 6.4 or 6.39. The lithium content may be $6.0 \leq n \leq 6.5$. For example, the lithium content may be 6.0 or 6.01 or 6.1 or $6.2 \leq n \leq 6.5$ or 6.49 or 6.4 or 6.39. These ranges have proven to be particularly advantageous.

Lithium content n may be lowered by an increase in the B' and/or B" content (b' and/or b") and/or the C' and/or C" content (c' and/or c") and may be increased by increasing the A' and/or A" content (a' and/or a") and vice versa to adjust n within the desired range.

Within the scope of another specific embodiment, B' stands for Ta or for Ta plus at least one element selected from the group including Nb, Sb and Bi.

For example, b'>0 and/or b">0 is/are possible.

Within the scope of another specific embodiment, b'+b">0.

B" may stand in particular for Te.

Within the scope of another specific embodiment, C' stands for Al.

Within the scope of another specific embodiment, C" stands for Si.

For example, c'>0 and/or c">0 is/are also possible.

Within the scope of another specific embodiment, c'+c">0.

Within the scope of another specific embodiment, A stands for La or for La plus at least one element selected from the group including Y, Pr, Nd, Sm, Eu, Gd, Tb, Dy, Ho, Er, Tm and Yb. A may stand for La in particular.

For example, a'>0 and/or a">0 is/are possible.

Within the scope of another specific embodiment, a'+a">0.

Within the scope of another specific embodiment, the compound having a garnet-like crystal structure has the general chemical formula:

$$Li_n[La_{(3-a')}A'_{(a')}][Zr_{(2-b')}B'_{(b')}][Al_{(c')}Si_{(c'')}]O_{12}$$

where La and A' stand for a dodecahedral position of the garnet-like crystal structure, where A' stands for at least one element selected from the group including Ca, Sr and Ba and $0<a'<2$, where Zr and B' stand for an octahedral position of the garnet-like crystal structure, where B' stands for at least one element selected from the group including Ta, Nb, Sb and Bi and $0<b'\leq 2$, and where Al and Si stand for a tetrahedral position of the garnet-like crystal structure, where $0\leq c'<0.5$ and $0\leq c''<0.4$ and c'+c">0, in particular c'>0 and/or c">0, and
where n=7+a'+2·a"−b'−2·b"−3·c'−4·c" and 5.5≤n≤6.875, for example, 5.9≤n≤6.6, for example, 6.0≤n≤6.5.

Within the scope of another specific embodiment, C' and C", in particular Al and/or Si, stand for or occupy tetrahedral position 24d of the garnet-like crystal structure.

Within the scope of another specific embodiment, B, B' and B", in particular Zr and B', stand for or occupy octahedral position 16a of the garnet-like crystal structure.

Within the scope of another specific embodiment, A, A' and A", in particular A', stand(s) or occupy/occupies dodecahedral position 24c of the garnet-like crystal structure.

For example, Li may occupy octahedral position 96h and/or tetrahedral position 24d, for example, together with C' and C" of the garnet-like crystal structure.

It is possible that if B' is Nb, in particular Ta and/or Nb, in the compounds, then 6.0<n<6.4 or 5.5≤n≤6.875, for example, 5.9≤n≤6.6, in particular 6.0≤n≤6.5, and c'+c">0 and/or a'+a">0; and/or if b'=2, then 6.0<n<6.875, for example, 6.0<n≤6.6, for example, 6.0<n≤6.5 or 5.5≤n≤6.875, for example, 5.9≤n≤6.6, in particular 6.0≤n≤6.5 and c'+c">0, or if 1.8<b'≤2, then c'+c">0, for example, c'+c">0.1 or 6.0<n<6.875, for example, 6.0<n≤6.5 or 5.5≤n≤6.875, for example, 5.9≤n≤6.6, in particular 6.0≤n≤6.5 and c'+c">0, and/or if 0≤b'≤0.5, for example, 0≤b'≤0.65, for example, 0≤b'≤1, then a'+a">0, for example, a'+a">0.2 and/or c'+c">0; and/or if C' is Al, then c">0 and/or b'+b">0, in particular b'>0 and/or a'+a">0, in particular a'>0.

Another subject matter of the present invention is a lithium ion conductor, in particular a lithium ion-conducting solid electrolyte, which contains a compound according to the present invention.

Furthermore, the present invention relates to a galvanic cell, in particular a battery, for example, based on lithium, which includes a compound according to the present invention or a lithium ion conductor according to the present invention.

Within the scope of one specific embodiment, the galvanic cell is a lithium-sulfur cell, a lithium-oxygen cell or a lithium-ion cell.

Within the scope of another specific embodiment, the galvanic cell includes the compound according to the present invention or the lithium ion conductor according to the present invention as the lithium ion-conducting solid electrolyte, in particular for separating the cathode and the anode.

Finally, the present invention relates to a method for synthesis of a compound according to the present invention as well as compounds synthesized by this method, the method including the following method steps:

a) supplying a powder mixture including, in particular containing:
   at least one lithium compound and
   at least one compound of an element selected from the group including La, Y, Pr, Nd, Sm, Eu, Gd, Tb, Dy, Ho, Er, Tm and Yb and
   at least one compound of an element selected from the group including Zr, Hf, Sn, Ta, Nb, Sb, Bi, Te, W and Mo and
   optionally at least one compound of an element selected from the group including Al, Ga, Si and Ge and/or
   optionally at least one compound of an element selected from the group including Ca, Sr, Ba, Na and K,
   the powder mixture containing the compounds of the elements different from lithium in stoichiometric amounts, which are selected in such a way that the lithium content of the compound having a garnet-like crystal structure to be formed is in a range of 5.5≤n≤6.875, for example, 5.9≤n≤6.6, in particular 6.0≤n≤6.5;

b) calcining the powder mixture at a temperature in a temperature range from ≥600° C. to ≤1000° C., in particular from ≥850° C. to ≤950° C., for example, at approximately 900° C., c) optionally pressing the powder mixture to form a molded body, in particular under uniaxial and isostatic pressure, d) sintering the powder mixture or the molded body at a temperature in a temperature range from ≥900° C. to ≤1250° C., in particular from ≥1100° C. to ≤1200° C., for example, at approximately 1150° C.

The at least one lithium compound may be selected, for example, from the group including lithium carbonate, lithium nitrate, lithium hydroxide, lithium oxide and mixtures thereof.

The compounds of the elements different from lithium may be selected, for example, from the group including oxides, nitrates, hydroxides, carbonates, acetates and mixtures thereof.

Lithium may be used in an excess in particular, for example, of 10 wt % to compensate for the loss of lithium during sintering.

The purity of the starting compounds may be ≥90% in particular. Zirconium compounds may be an exception and a technical grade may be used, possibly resulting in some hafnium content.

Method step a) may take place in particular at ≥100° C., for example, for ≥30 minutes or ≥45 minutes or ≥1 hour.

The heating rate in method step d) may be, for example, ≥1 K/min, for example, ≥3 K/min.

Additional advantages and advantageous embodiments of the subject matters according to the present invention are illustrated by the drawings and explained in the following description. It should be pointed out here that the drawings have only a descriptive character and are not intended to restrict the present invention in any form.

DETAILED DESCRIPTION

Figure 1:
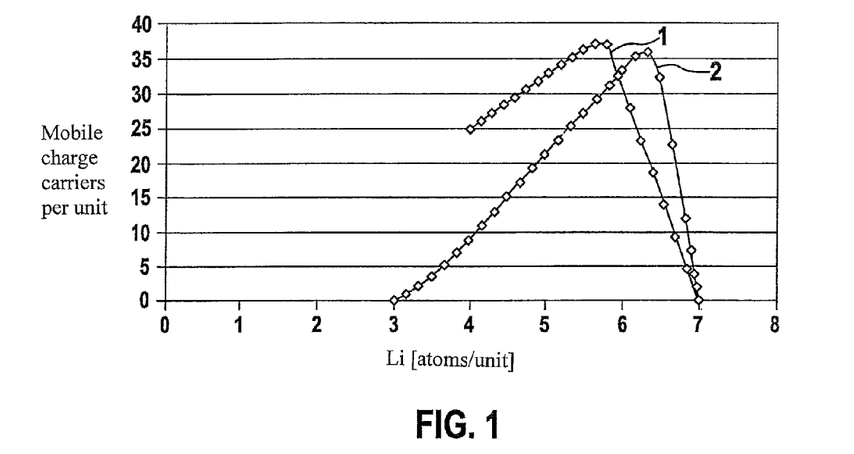
FIG. 1 shows a graph to illustrate calculated results with respect to the dependence of the number of mobile charge carriers on lithium content n.

FIG. 1 shows the results of calculations of the mobile charge carriers for compounds of varying composition having a garnet-like crystal structure starting from the original compound $Li_7La_3Zr_2O_{12}$ as a function of the lithium content per garnet formula unit. Occupation numbers were used to calculate the charge carriers. The activation energy for activation of mobile charge carriers was not taken into account in the calculations.

The curve labeled with reference numeral 2 illustrates the results for occupation of the octahedral position, otherwise occupied by $Zr^{4+}$, with a pentavalent element, for example, $Ta^{5+}$, where the curve labeled with reference numeral 1 illustrates the results when the tetrahedral position otherwise occupied by $Li^+$ is occupied by a trivalent element, for example, $Al^{3+}$, while the zirconium content remains the same.

FIG. 1 shows that, according to the carried out calculations, a high ion conductivity is to be expected for occupation of the octahedral position in a range from 5.9 to 6.5 and for occupation of the tetrahedral position in a range from 5.3 to 6.0, the calculated maximum ascertained for the mobile charge carriers is at approximately 6.3 lithium atoms per garnet formula unit for occupation of the octahedral position, and 5.8 lithium atoms per garnet formula unit for occupation of the tetrahedral position. FIG. 1 suggests that the maximum ion conductivity is to be expected in a range between 5.5 and 6.5 when the octahedral and tetrahedral positions are doped at the same time.

Compounds having a garnet-like structure and containing Ta, Nb, Al, Si and Sr were prepared by a solid-state reaction at elevated temperatures, starting in particular from the original structure $Li_7La_3Zr_2O_{12}$. Stoichiometric amounts of the starting materials of a high purity were used for the synthesis. Lithium in the form of $Li_2CO_3$, in particular having a purity of >99.0%, for example, was used in a 10% excess in particular. The excess was used to compensate for the loss of lithium during the sintering process. Lanthanum was used in the form of $La_2O_3$ in particular and in a purity of >99.99%, for example, having been dried for 12 hours at 900° C. in particular. Zirconium and strontium, in particular in the form of $ZrO_2$ and $SrCO_3$ in a purity of >99%, for example, were used in particular. Aluminum was used in the form of $\gamma$-$Al_2O_3$, for example, in a purity of 99.60%, for example. Silicon, tantalum and niobium, in particular in the form of $SiO_2$ and $Ta_2O_5$ and $Nb_2O_5$ in a purity of >99.85% in particular were used. The weighed powders were mixed with water for 1 hour at approximately 100° C. in a rotary evaporator. The powder mixtures were calcined at 900° C. The products were pressed under a uniaxial and isostatic pressure to form tablets which were sintered for 5 hours at 1150° C. The heating rate was 3 K/min in all cases.

Table 1 shows the composition and ion conductivity of the compounds synthesized:

TABLE 1

Composition and ion conductivity

| Composition | Ion conductivity (S/cm) |
| --- | --- |
| $Li_7La_3Zr_2O_{12}$ | $1 \cdot 10^{-7}$ |
| $Li_{6.875}La_3Ta_{0.125}Zr_{1.875}O_{12}$ | $4.0 \cdot 10^{-5}$ |
| $Li_{6.75}La_3Ta_{0.25}Zr_{1.75}O_{12}$ | $1.3 \cdot 10^{-4}$ |
| $Li_{6.5}La_3Ta_{0.5}Zr_{1.5}O_{12}$ | $1.5 \cdot 10^{-4}$ |
| $Li_{6.25}La_3Ta_{0.75}Zr_{1.25}O_{12}$ | $2.7 \cdot 10^{-4}$ |
| $Li_6La_3TaZrO_{12}$ | $2.0 \cdot 10^{-4}$ |
| $Li_{5.5}La_3Ta_{1.5}Zr_{0.5}O_{12}$ | $4.0 \cdot 10^{-5}$ |
| $Li_5La_3Ta_2O_{12}$ | $2.8 \cdot 10^{-5}$ |
| $Al_{0.1}Li_{6.7}La_3Zr_2O_{12}$ | $1.3 \cdot 10^{-5}$ |
| $Al_{0.17}Li_{6.49}La_3Zr_2O_{12}$ | $3.2 \cdot 10^{-4}$ |
| $Al_{0.23}Li_{6.31}La_3Zr_2O_{12}$ | $5.2 \cdot 10^{-4}$ |
| $Al_{0.29}Li_{6.13}La_3Zr_2O_{12}$ | $4.4 \cdot 10^{-4}$ |
| $Al_{0.35}Li_{5.95}La_3Zr_2O_{12}$ | $9.4 \cdot 10^{-5}$ |
| $Al_{0.3}Li_{5.85}Sr_{0.25}La_{2.75}Nb_{0.5}Zr_{1.5}O_{12}$ | $1.5 \cdot 10^{-4}$ |
| $Si_{0.05}Li_{5.3}La_3Zr_2O_{12}$ | $1.5 \cdot 10^{-6}$ |
| $Si_{0.1}Li_{6.6}La_3Zr_2O_{12}$ | $2.8 \cdot 10^{-6}$ |
| $Si_{0.2}Li_{6.2}La_3Zr_2O_{12}$ | $4.4 \cdot 10^{-5}$ |
| $Si_{0.3}Li_{5.8}La_3Zr_2O_{12}$ | $1.5 \cdot 10^{-5}$ |
| $Si_{0.4}Li_{5.4}La_3Zr_2O_{12}$ | $7.3 \cdot 10^{-6}$ |

The ion conductivity of the sintered tablets was measured in air at room temperature with the aid of an impedance spectrometer (Solatron; 0.05 Hz-10 MHz) using lithium-blocking gold electrodes.

Figure 3:
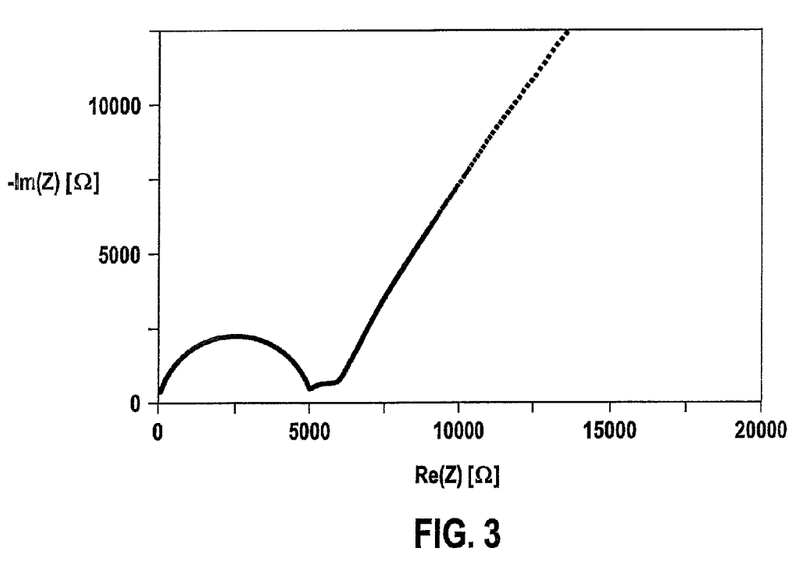
FIG. 3 shows an impedance spectrum of $Li_{6.25}La_3Ta_{0.75}Zr_{1.25}O_{12}$.
Figure 4:
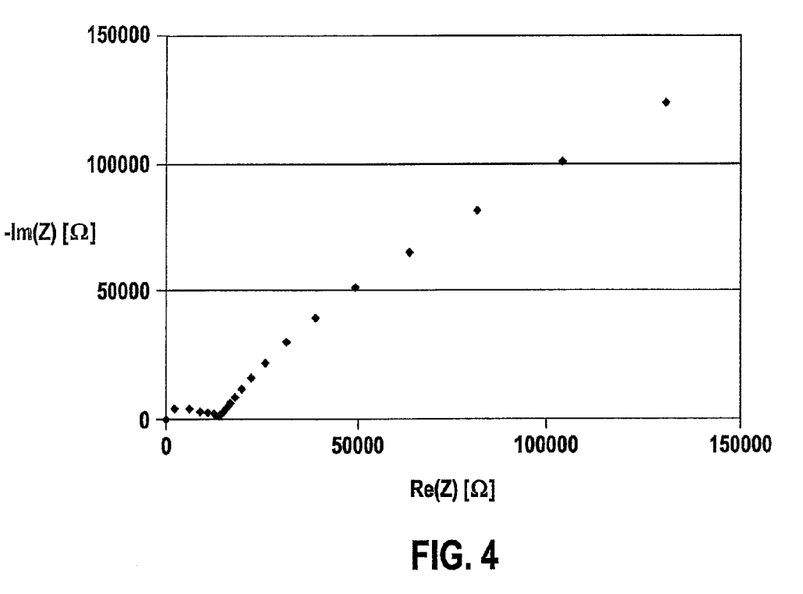
FIG. 4 shows an impedance spectrum of $Al_{0.17}Li_{6.49}La_3Zr_2O_{12}$.

FIG. 3 shows the impedance spectrum of $Li_{6.25}La_3Ta_{0.75}Zr_{1.25}O_{12}$ and FIG. 4 shows the impedance spectrum of $Al_{0.17}Li_{6.49}La_3ZrO_{12}$ as examples. The rising branch in the low-frequency range of the spectra is an indication of the lithium-ion conductivity of the material.

Figure 2:
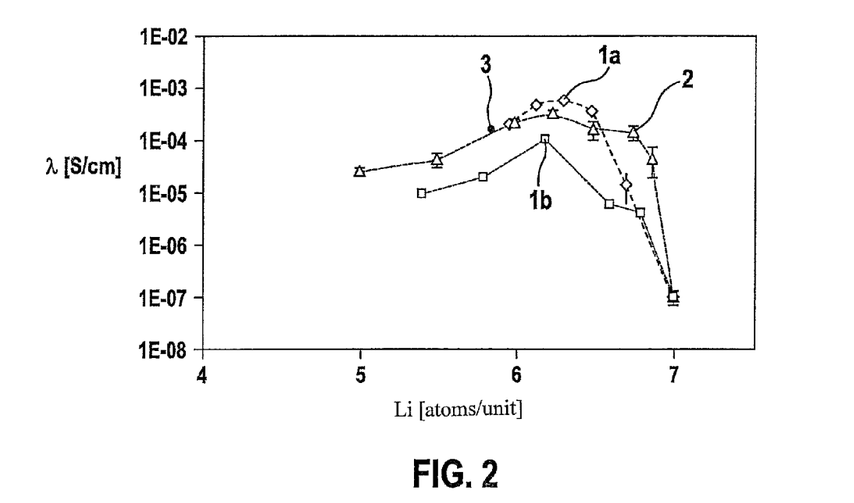
FIG. 2 shows a graph to illustrate experimental results with respect to the dependence of the ion conductivity on lithium content n.

The ion conductivity values ascertained at room temperature are shown in Table 1 and FIG. 2. FIG. 2 shows a graph in which the ion conductivity of the compounds synthesized is plotted as a function of the lithium content per garnet formula unit. FIG. 2 illustrates the fact that the ion conductivity surprisingly has a maximum at a lithium content of approximately 6.3 for occupation of the octahedral position with Ta and Nb and optionally in the dodecahedral position with Sr as well as for occupation of the tetrahedral position with Al and Si. The values ascertained experimentally follow a curve which is very similar to the curve ascertained by computer. It is noteworthy that the maximums of the tetrahedrally doped compounds (1a: Al; 1b: Si) do not occur at a lithium content of 5.8, as predicted by the theoretical calculation (1), but instead also occur at 6.3, like those of the octahedrally doped compounds (2: Ta). This may be explained by the fact that in the theoretical calculation the influence of the activation energy for the movement of lithium ions was not taken into account, although in practice, this evidently results in a shift in the curve ascertained by computer for tetrahedrally doped compounds (1) in the direction of a higher lithium content n, in particular having a maximum in the range around 6.3.

Table 1 and FIG. 2 show that, of the compounds synthesized, $Al_{0.23}Li_{6.31}La_3Zr_2O_{12}$ at $5.2·10^{-4}$ S/cm has the highest ion conductivity. FIG. 2 shows the ion conductivity of $Al_{0.3}Li_{5.85}Sr_{0.25}La_{2.75}Nb_{0.5}Zr_{1.5}O_{12}$ labeled with reference numeral 3. Table 1 shows that $Al_{0.3}Li_{5.85}Sr_{0.25}La_{2.75}Nb_{0.5}Zr_{1.5}O_{12}$ at $1.5·10^{-4}$ S/cm has an ion conductivity similar to that of $Li_{6.5}La_3Ta_{0.5}Zr_{1.5}O_{12}$ at $1.5·10^{-4}$ S/cm. FIG. 2 illustrates that lithium content n of $Al_{0.3}Li_{5.85}Sr_{0.25}La_{2.75}Nb_{0.5}Zr_{1.5}O_{12}$ (3) at n=5.85 is too low to achieve an optimal ion conductivity (n≈6.3). Lithium content n could be achieved here by reducing the aluminum content and/or increasing the strontium content, for example, among other things. It is therefore to be expected that a definitely higher lithium-ion conductivity than that of $Li_{6.5}La_3Ta_{0.5}Zr_{1.5}O_{12}$ could be achieved by modifying $Al_{0.3}Li_{5.85}Sr_{0.25}La_{2.75}Nb_{0.5}Zr_{1.5}O_{12}$ to form a similar compound having a lithium content n of approximately 6.3. The curve ascertained experimentally and corrected by computer, in particular with respect to the activation energy, indicates that an ion conductivity greater than $1.5·10^{-4}$ S/cm and in particular even greater than $4.4·10^{-4}$ S/cm could be achieved at an aluminum content of 0.15 or a strontium content of 0.7, for example, or an aluminum content of 0.15 to 0.3 and a strontium content of 0.25 to 0.7.

On the whole, the experimental findings illustrated in FIG. 2 confirm that ion conductivity may be increased by forming voids, increasing lithium ion mobility, and by occupation of tetrahedral positions, which act as lithium traps, by other elements, and a maximum ion conductivity in the range of a lithium content n of 6.3 may surprisingly be achieved.

It has been demonstrated by an Ab Initio computer simulation that a crystal structure in which $Al^{3+}$ occupies the tetrahedral positions has the lowest total energy. This permits the conclusion to be drawn that $Al^{3+}$ favors the tetrahedral positions of a garnet-like crystal structure.

The result of the Ab Initio computer simulation is consistent with the result ascertained with the aid of x-ray diffractometry and Rietveld refinement for the occupation of aluminum in the garnet-like compound $Al_{0.2}Li_{6.4}La_3Zr_2O_{12}$. For better resolution, pure κ-α1 radiation was used in the measurement. The TOPAS program was used for adaptation with the aid of the Rietveld method. The results of the Rietveld refinement were of a good quality. Table 2 summarizes the results of the Rietveld refinement:

TABLE 2

Results of the Rietveld refinement with respect to the occupation of the tetrahedral and octahedral positions in $Al_{0.2}Li_6La_3Zr_2O_{12}$

| Position | Relative Al occupation |
|---|---|
| Tetrahedron 24d | 0.2 |
| Octahedron 48g | 0 |
| Octahedron 96h | <0.03 |

Table 2 shows that tetrahedral position 24d in $Al_{0.2}Li_{6.4}La_3Zr_2O_{12}$ is occupied by an x-ray-sensitive element, in particular aluminum, but octahedral positions 48g and 96h are not occupied by an x-ray-sensitive element. The positions of the lithium atoms could not be determined from the x-ray diffraction measurements.

Figure 5:
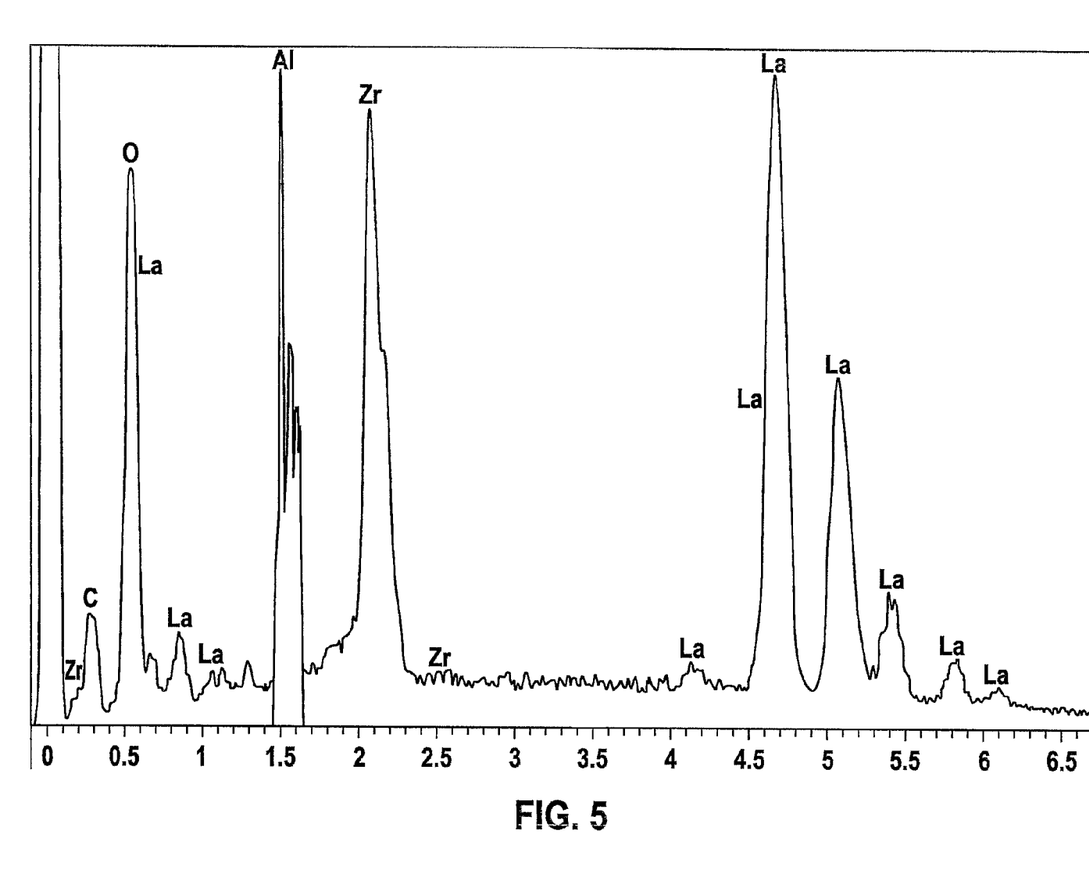
FIG. 5 shows a REM-EDS/WDS spectrum of a randomly selected crystal grain in a sample of $Al_{0.2}Li_{6.4}La_3Zr_2O_{12}$.

FIG. 5 shows the result of one of many REM-EDS/WDS analyses of different randomly selected crystal grains in a cross-section polish through a tablet of $Al_{0.2}Li_{6.4}La_3Zr_2O_{12}$. FIG. 5 shows that aluminum is present in the expected amounts in both crystals. This permits the conclusion to be drawn that the aluminum atoms are incorporated into the garnet-like crystal structure and are not present as a secondary phase in the material. This also supports the result of the Rietveld refinement, namely that aluminum occupies tetrahedral positions 24d.

What is claimed is:
1. A lithium ion conductor, comprising:
a compound that includes a garnet-like crystal structure of the general chemical formula $Li_n[A_{(3-a'-a'')}A'_{(a')}A''_{(a'')}][B_{(2-b'-b'')}B'_{(b')}B''_{(b'')}][C'_{(c')}C''_{(c'')}]O_{12}$, wherein:
A stands for a dodecahedral position of the garnet-like crystal structure and stands for at least one element selected from the group consisting of La, Y, Pr, Nd, Sm, Eu, Gd, Tb, Dy, Ho, Er, Tm and Yb;
A' stands for a dodecahedral position of the garnet-like crystal structure and stands for at least one element selected from the group consisting of Ca, Sr and Ba;
A" stands for a dodecahedral position of the garnet-like crystal structure and stands for at least one element selected from the group consisting of Na and K;

$0 \leq a' < 2$;

$0 \leq a'' < 1$;

B stands for an octahedral position of the garnet-like crystal structure and stands for at least one element selected from the group consisting of Zr, Hf and Sn;
B' stands for an octahedral position of the garnet-like crystal structure and stands for at least one element selected from the group consisting of Ta, Nb, Sb and Bi;
B" stands for an octahedral position of the garnet-like crystal structure and stands for at least one element selected from the group consisting of Te, W and Mo;

$0 \leq b' \leq 2$;

$0 \leq b'' \leq 2$;

C' stands for a tetrahedral position of the garnet-like crystal structure and stands for at least one element selected from the group consisting of Al and Ga;
C" stands for a tetrahedral position of the garnet-like crystal structure and stands for at least one element selected from the group consisting of Si and Ge;

$0 \le c' \le 0.5;$ $0 \le c'' \le 0.4;$ $n = 7 + a' + 2 \cdot a'' - b' - 2 \cdot b'' - 3 \cdot c' - 4 \cdot c'';$ $5.5 \le n \le 6.875;$ when b'=2, 6.0<n<6.875 or 5.5≤n≤6.875, and c'+c''>0; and when B' is Nb, 6.0<n<6.4 or 5.5≤n≤6.875 and at least one of c'+c''>0 and a'+a''>0.

2. The lithium ion conductor of claim 1, wherein 5.9≤n≤6.6.

3. The lithium ion conductor of claim 1, wherein 6.0<n<6.5.

4. The lithium ion conductor of claim 1, wherein B' stands for Ta.

5. The lithium ion conductor of claim 1, wherein:

$0 < b' \le 2,$ and

B' stands for Ta and at least one element selected from the group consisting of Nb, Sb and Bi.

6. The lithium ion conductor of claim 1, wherein b'+b''>0.

7. The lithium ion conductor of claim 1, wherein at least one of C' stands for Al, C" stands for Si, and c'+c''>0.

8. The lithium ion conductor of claim 1, wherein a'+a''>0.

9. The lithium ion conductor of claim 1, wherein:

the garnet-like crystal structure is of the general chemical formula $Li_n[La_{(3-a')}A'_{(a')}][Zr_{(2-b')}B'_{(b')}][Al_{(c')}Si_{(c'')}]O_{12}$;

La and A' stand for a dodecahedral position of the garnet-like crystal structure;

A' stands for at least one element selected from the group including Ca, Sr and Ba;

$0 < a' < 2;$

Zr stands for an octahedral position of the garnet-like crystal structure;

B' stands for an octahedral position of the garnet-like crystal structure and stands for at least one element selected from the group including Ta, Nb, Sb and Bi;

$0 < b' \le 2;$

Al and Si stand for a tetrahedral position of the garnet-like crystal structure;

$0 \le c' \le 0.5;$ $0 < c'' \le 0.4;$ $c' + c'' > 0;$ $n = 7 + a' + 2 \cdot a'' - b' - 2 \cdot b'' - 3 \cdot c' - 4 \cdot c'';$ and $5.5 \le n \le 6.875.$ 10. The lithium ion conductor of claim 9, wherein 5.9≤n≤6.6.

11. The lithium ion conductor of claim 9, wherein 6.0≤n≤6.5.

12. The lithium ion conductor of claim 9, wherein 0<c'≤0.5.

13. The lithium ion conductor of claim 1, wherein C' and C" stand for tetrahedral position 24d of the garnet-like crystal structure.

14. The lithium ion conductor of claim 13, wherein C' stands for Al.

15. The lithium ion conductor of claim 13, wherein C" stands for Si.

16. The lithium ion conductor of claim 1, wherein B, B' and B" stand for octahedral position 16a of the garnet-like crystal structure.

17. The lithium ion conductor of claim 16, wherein B stands for Zr.

18. The lithium ion conductor of claim 1, wherein A, A' and A" stand for the dodecahedral position 24c of the garnet-like crystal structure.

19. The lithium ion conductor of claim 1, wherein A' stands for the dodecahedral position 24c of the garnet-like crystal structure.

20. The lithium ion conductor of claim 1, wherein the lithium ion conductor is part of a galvanic cell.

21. The lithium ion conductor of claim 20, wherein the galvanic cell is a lithium-sulfur cell, a lithium-oxygen cell, a lithium-ion cell, or a battery thereof.

22. The lithium ion conductor of claim 20, wherein the lithium ion conductor separates a cathode and an anode of the cell.

23. The lithium ion conductor of claim 1, wherein:

the lithium ion conductor is synthesized by:

(a) providing a powder mixture that includes:

at least one lithium compound;

at least one compound of an element selected from the group consisting of La, Y, Pr, Nd, Sm, Eu, Gd, Tb, Dy, Ho, Er, Tm and Yb; and at least one compound of an element selected from the group consisting of Zr, Hf, Sn, Ta, Nb, Sb, Bi, Te, W and Mo;

(b) calcining the powder mixture at a temperature t1 in a temperature range of from 600° C.≤t1≤1000° C.; and (c) sintering the powder mixture or the molded body at a temperature t2 in a temperature range of 900° C.≤t2≤1250° C.; and the powder mixture contains the compounds of elements different from lithium in stoichiometric amounts which are selected in such a way that the lithium content of the compound is in a range of 5.5≤n≤6.875.

24. The lithium ion conductor of claim 23, wherein the synthesis further includes pressing the powder mixture to form a molded body.

25. The lithium ion conductor of claim 24, wherein the pressing is under a uniaxial and isostatic pressure.

26. The lithium ion conductor of claim 23, wherein the powder mixture further includes at least one compound of an element selected from the group consisting of Al, Ga, Si and Ge.

27. The lithium ion conductor of claim 23, wherein the powder mixture further includes at least one compound of an element selected from the group consisting of Ca, Sr, Ba, Na and K.

28. The lithium ion conductor of claim 23, wherein the calcining temperature t1 is in a temperature range of 850° C.≤t1≤950° C.

29. The lithium ion conductor of claim 23, wherein the lithium content of the compound is in a range of 5.9≤n≤6.6.

30. The lithium ion conductor of claim 23, wherein the lithium content of the compound is in a range of 6.0≤n≤6.5.

31. The lithium ion conductor of claim 23, wherein the sintering temperature t2 is in a temperature range of 1100° C.≤t2≤1200° C.

32. A lithium ion conductor, comprising:

a compound that includes a garnet-like crystal structure of the general chemical formula $Li_n[A_{(3-a'-a'')}A'_{(a')}A''_{(a'')}][B_{(2-b'-b'')}B'_{(b')}B''_{(b'')}][C'_{(c')}C''_{(c'')}]O_{12}$, wherein:

A stands for a dodecahedral position of the garnet-like crystal structure and stands for at least one element selected from the group consisting of La, Y, Pr, Nd, Sm, Eu, Gd, Tb, Dy, Ho, Er, Tm and Yb;

A' stands for a dodecahedral position of the garnet-like crystal structure and stands for at least one element selected from the group consisting of Ca, Sr and Ba;

A" stands for a dodecahedral position of the garnet-like crystal structure and stands for at least one element selected from the group consisting of Na and K;

$0 \leq a' < 2$;

$0 < a'' < 1$;

B stands for an octahedral position of the garnet-like crystal structure and stands for at least one element selected from the group consisting of Zr, Hf and Sn;

B' stands for an octahedral position of the garnet-like crystal structure and stands for at least one element selected from the group consisting of Ta, Nb, Sb and Bi;

B" stands for an octahedral position of the garnet-like crystal structure and stands for at least one element selected from the group consisting of Te, W and Mo;

$0 \leq b' \leq 2$;

$0 \leq b'' \leq 2$;

C' stands for a tetrahedral position of the garnet-like crystal structure and stands for at least one element selected from the group consisting of Al and Ga;

C" stands for a tetrahedral position of the garnet-like crystal structure and stands for at least one element selected from the group consisting of Si and Ge;

$0 \leq c' \leq 0.5$;

$0 < c'' \leq 0.4$;

$n = 7 + a' + 2 \cdot a'' - b' - 2 \cdot b'' - 3 \cdot c' - 4 \cdot c''$;

$5.5 \leq n \leq 6.875$;

when b'=2, $6.0 < n < 6.875$ or $5.5 \leq n \leq 6.875$, and c'+c">0; and when B' is Nb, $6.0 < n < 6.4$ or $5.5 \leq n \leq 6.875$ and at least one of c'+c">0 and a'+a">0.

33. A lithium ion conductor, comprising:

a compound that includes a garnet-like crystal structure of the general chemical formula $Li_n[A_{(3-a'-a'')}A'_{(a')}A''_{(a'')}][B_{(2-b'-b'')}B'_{(b')}B''_{(b'')}][C'_{(c')}C''_{(c'')}]O_{12}$, wherein:

A stands for a dodecahedral position of the garnet-like crystal structure and stands for at least one element selected from the group consisting of La, Y, Pr, Nd, Sm, Eu, Gd, Tb, Dy, Ho, Er, Tm and Yb;

A' stands for a dodecahedral position of the garnet-like crystal structure and stands for at least one element selected from the group consisting of Ca, Sr and Ba;

A" stands for a dodecahedral position of the garnet-like crystal structure and stands for at least one element selected from the group consisting of Na and K;

$0 \leq a' < 2$;

$0 \leq a'' < 1$;

B stands for an octahedral position of the garnet-like crystal structure and stands for at least one element selected from the group consisting of Zr, Hf and Sn;

B' stands for an octahedral position of the garnet-like crystal structure and stands for at least one element selected from the group consisting of Ta, Nb, Sb and Bi;

B" stands for an octahedral position of the garnet-like crystal structure and stands for at least one element selected from the group consisting of Te, W and Mo;

$0 \leq b' \leq 2$;

$0 < b'' \leq 2$;

C' stands for a tetrahedral position of the garnet-like crystal structure and stands for at least one element selected from the group consisting of Al and Ga;

C" stands for a tetrahedral position of the garnet-like crystal structure and stands for at least one element selected from the group consisting of Si and Ge;

$0 \leq c' \leq 0.5$;

$0 < c'' \leq 0.4$;

$n = 7 + a' + 2 \cdot a'' - b' - 2 \cdot b'' - 3 \cdot c' - 4 \cdot c''$;

$5.5 \leq n \leq 6.875$;

when b'=2, $6.0 < n < 6.875$ or $5.5 \leq n \leq 6.875$, and c'+c">0; and when B' is Nb, $6.0 < n < 6.4$ or $5.5 \leq n \leq 6.875$ and at least one of c'+c">0 and a'+a">0.

* * * * *